US007269425B2

(12) United States Patent
Valkó et al.

(10) Patent No.: US 7,269,425 B2
(45) Date of Patent: Sep. 11, 2007

(54) LOCATION MANAGEMENT SYSTEM AND A PAGING SERVER IN A WIRELESS IP NETWORK

(75) Inventors: András Valkó, Budapest (HU); Adám Magi, Budapest (HU); Zoltán Turanyi, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 451 days.

(21) Appl. No.: 10/489,223

(22) PCT Filed: Sep. 3, 2002

(86) PCT No.: PCT/SE02/01569

§ 371 (c)(1),
(2), (4) Date: May 19, 2004

(87) PCT Pub. No.: WO03/024144

PCT Pub. Date: Mar. 20, 2003

(65) Prior Publication Data

US 2004/0259567 A1    Dec. 23, 2004

Related U.S. Application Data

(60) Provisional application No. 60/322,332, filed on Sep. 12, 2001.

(51) Int. Cl.
*H04Q 7/20* (2006.01)
(52) U.S. Cl. .................. 455/456.1; 455/456.5; 455/458
(58) Field of Classification Search ........... 455/432.1, 455/456.1–456.6, 458

See application file for complete search history.

(56) References Cited

U.S. PATENT DOCUMENTS

| 5,956,637 | A | 9/1999 | Ericsson et al. |
| 6,647,264 | B1 * | 11/2003 | Sasamoto ............. 455/445 |
| 2001/0027107 | A1 * | 10/2001 | Shinozaki et al. ....... 455/456 |

FOREIGN PATENT DOCUMENTS

EP    1 113 691    7/2001

(Continued)

OTHER PUBLICATIONS

Castelluccia, C., "Extending Mobile IP with Adaptive Individual Paging: A Performance Analysis", Proceedings ISCC 2000. Fifth IEEE Symposium on Computers and Communications, Antibes-Juan les Pins, France Jul. 3-6, 2000, pp. 113-118.

(Continued)

*Primary Examiner*—Jean Gelin
*Assistant Examiner*—Jaime Holliday

(57) ABSTRACT

The present invention relates to a location management system and a paging server in an Internet Protocol, IP, communication network that is adapted for wireless communication. The wireless IP network comprises multiple routers wherein at least one of the routers is an access router adapted for wireless communication with mobile nodes. The location management system is divided into at least one location area manager, and at least one regional location manager, the location area manager is a first signaling server and the regional location manager is a second signaling server, one of said location area manager and regional location manager comprises means for maintaining a list of mobile nodes located within at least one location area. The regional location manager comprises means for managing location information within a single location management region, and wherein the location area manager and regional location manager are connected to each other and adapted to exchange information. Furthermore, the paging server comprises means for obtaining location management information from the location management system and means for multicasting paging requests to the access routers wherein the access routers is determined by using said location management information.

26 Claims, 10 Drawing Sheets

FOREIGN PATENT DOCUMENTS

| WO | WO-00/44149 | 7/2000 |
|----|-------------|--------|
| WO | WO-02/63912 | 8/2002 |

OTHER PUBLICATIONS

Misra, A. et al., "IDMP-Based Fast Handoffs and Paging in IP-Based 4G Mobile Networks", IEEE Communications Magazine, vol. 40, No. 3, Mar. 2002, pp. 138-145.

Campbell, A.T. et al., "Design, Implementation, and Evaluation of Cellular IP", IEEE Personal Communications, vol. 7, No. 4, Aug. 2000, pp. 42-49.

IST-1999-10050 BRAIN, "BRAIN architecture specifications and models, BRAIN functionality and protocol specification", Mar. 30, 2001 (total pp. 425).

* cited by examiner

LOCATION MANAGEMENT SYSTEM AND A PAGING SERVER IN A WIRELESS IP NETWORK

This patent application claims priority from and incorporates by reference the entire disclosure of U.S. Provisional Patent Application No. 60/322,332, filed on Sep. 12, 2001.

FIELD OF INVENTION

The present invention relates to a communication system with Internet Protocol (IP) based transmission.

In particular, the present invention relates to a location management system and a paging server connectable to said location management system in an IP communication system adapted for wireless communication with Mobile Nodes (MN).

BACKGROUND OF THE INVENTION

The growing importance of the Internet and of mobile communication creates the demand to attach mobile computing devices adapted for wireless communication with mobile nodes to the Internet. The original Internet Protocol (IP) does not support mobile communication, therefore the Internet protocols must be augmented with mobility support.

The BRAIN Candidate Mobility Protocol (BCMP) is an example of a communication protocol that allows a network to provide wireless Internet access for mobile computers. BCMP is further described in IST-1999-10050 BRAIN, "BRAIN Architecture specifications and models, BRAIN functionality and protocol specification," published on Mar. 30, 2001. Mobile computers adapted for BCMP is allowed to connect to a BCMP network and can send and receive data packets to and from other computers connected to the Internet.

FIG. 1 illustrates a BCMP network 100. The BCMP network 100 comprises gateways 108, routers 106, Access Routers (AR) 104 and Mobile Nodes (MN) 102. At least one of the routers 106, is an Anchor Point (ANP) that owns and allocates IP addresses, authenticates users, maintains user records, and tunnels packets towards the Mobile Nodes (MN) 102, e.g. laptops, which are connected to the IP network via the ARs 104. The ARs 104 is connected to a wireless interface towards the MNs 102 and route information received from the MNs 102 further into the IP network. The ARs 104 are called BRAIN Access Routers (BAR) within the BCMP network 100. Each AR is adapted to terminate tunnels from the ANPs and forwards packets to/from mobile hosts, e.g. terminals such as mobile phones, laptops or palmtop computers. The gateways 108 (i.e. border routers towards e.g. Internet) are called BRAIN Mobility Gateways (BMG) in BCMP. The gateways 108 are not required to have BCMP specific functionality. The role of the gateways 108 is to shield the rest of the BCMP network from the exterior routing protocols and to distribute traffic to the appropriate ANPs 106. Besides these entities, the BCMP network 100 can also incorporate other network entities, such as AAA servers that store and manage user related information, Network Management functions, Quality of Service functions, Resource Management function, etc.

Each ANP 106 has globally routable address space and it allocates an IP address to the MN 102 when the MN 102 attach to the BCMP network 100. This address is kept constant, despite handovers. The handover procedure is described further below. The pool of IP addresses owned by the ANP 106 is advertised using legacy IP routing inside the BCMP network 100 and toward external IP networks. This ensures that packets addressed to the address of the MN 102 obtained locally are routed, by means of standard IP routing, to the ANP 106 that allocated the address. The Anchor Points 106, in turn, use IP-in-IP encapsulation to forward packets to the AR 104 where the MN 102 that is the destination is located at the moment.

When the MN 102 first contacts the AR 104 it must execute a login procedure. First it sends a login request message to the AR 104 at which it has appeared. In this request the MN 102 provides login and security information (e.g., mobile user identifier). The AR 104 selects the ANP 106 for the MN 102 according to a policy specified by an operator and forwards the login request to it. The MN 102 is not required to be aware of the policy and of the internal structure of the AR 104. The selected ANP 106 identifies and authenticates the MN 102 and allocates a globally routable IP address and a new session identifier for the MN 102. The session identifier is a temporary identifier used to index control messages in the BCMP network 100. The session identifier, a security key and the IP address are sent back to the MN 102 in a login response message.

As the MN 102 move, it can connect to a new AR 104 when necessary. This is called a handover. The ANPs 106 must maintain up-to-date location information of MNs 102 they have allocated an address for and must update this information when 'their' MNs 102 move to another AR 104. For this purpose, the ARs 104 notify ANPs 106 when the handover occurs. In addition, the BCMP can incorporate various local handover mechanisms that improve the performance of handover by, for example, building a temporary path from the old AR 104 to the new AR 104 in order to avoid loss of data packets sent to the MN 102.

If the MN 102 moves far away from its ANP 106 then the tunnel between the ANP 106 and AR 104 may become very long. In order to avoid long tunnels, the BCMP allows (but does not mandate) the network operator to request that the MN 102 changes the ANP 106. This improves routing efficiency in the network, in exchange for exposing mobility toward the Internet: the change of the ANP 106 requires a change of the MN's 102 IP address, which is a global mobility event. Alternatively, the operators may choose to accept long tunnels between the ANPs and the ARs in order to completely hide mobility from external networks.

The BCMP protocol provides a paging support that allows the MNs to enter idle mode and to reduce location update signalling load inside the AR.

FIG. 2, illustrates a paging scenario in a BCMP network. The BCMP network 200 comprises the following nodes: a gateway 212 connected to the Internet 214, routers 210,214, wherein some of the routers are ANPs 208,216, ARs 204,206 and a MN 202. The nodes within the BCMP network exemplified by FIG. 2 comprise the same functionality as the network depicted in FIG. 1. The MN 202 is in idle mode when it is turned on but is not involved in transmission of voice, data or certain time sensitive control information in contrast to active mode that occurs when the MN 202 is involved in such transmission. When the MN changes its state to then it informs its AR 204 about the mode change and performs handover in active mode when it moves 226 to the new AR 206 (as long as it stays within the same group of ARs 204,206 called a Paging Area (PA) PA1). The ARs are not notified about the handover, which results in that the ARs will not know in which AR:s proximity the MN 202 is found. When data packets 218 are sent to the MN 202, these 218 will still be routed to MN's 202 old AR 204. This AR 204 knows that the MN 202 is idle and hence instead of transmitting its packets through the radio interface, it multicasts a paging request message 220 to all ARs 204,206 within the paging area PA1. Each AR 204,206 forwards the paging request 220 through its radio interface on a common control channel directed to the correct MN 202. When the MN receives the paging request 220, it performs a BCMP handover 222 and returns to normal mode of operation. This allows its packets to be routed to the MN 202.

If, while in idle mode, the MN 202 moves 228 to an AR 224 that belongs to a different paging area PA2 than its old AR 204, then it performs a handover and returns to idle state immediately. The rest of the operation is the same as the steps described above.

The drawback of the paging mechanism specified by BCMP is that paging request messages 220 must be sent out by the ARs 204,206,224 and hence the ARs 204,206,224 must know which ARs 204,206,224 belong to the same paging area. This means that the configuration and possible reconfiguration of paging areas involves communication with ARs. If, for example, a new AR is added to the network than in addition to configuring this AR, all the other ARs in the same paging area must be notified so they can update their paging areas.

There are additional drawbacks of the BCMP paging mechanism if the operator employs advanced paging schemes. A paging scheme defines the list and order of ARs where the MN is paged when it has incoming data packets. An advanced paging scheme may require, for example, that a particular user is always paged first through one particular AR and next through the ARs of its paging area. In this case, the BCMP paging scheme requires that this scheme is known by each AR, which causes significant configuration and processing load on the ARs.

As another insufficiency, the BCMP protocol as described above contains no functions that would enable operators to determine which mobile nodes are located in certain parts of the network (e.g., for location aware services). Therefore, it is not possible to trigger external entities when certain users/nodes move into or outside pre-defined areas if their movement matches a certain pattern e.g. speed and direction. For example, an owner of a coffee shop would like to send an ad to each user that enters the district containing the coffee shop. This could be a service provided by the BCMP network, but it needs location management function. A pre-defined area is specified as a set of cells. A cell is the coverage area of a wireless access point within an access router. In this example, an area could be the cell that contains the coffee shop, plus all neighbouring cells. As another service, the ad would be sent to each user that is moving toward the coffee shop. This service requires a location management infrastructure.

HMIPv6 is another protocol for mobile IP that has a similar network architecture to BCMP. The drawback of HMIPv6 regarding the location management is identical to BCMP. One difference between BCMP and HMIPv6 is that HMIPv6 uses IETF (Internet Engineering Task Force) Mobile IPv6 message formats.

SUMMARY

The present invention tackles the above stated problem associated with the fact that conventional IP networks do not provide an efficient and simple tool for locating a mobile node within said IP network.

Thus, an object of the present invention to provide a location management system within said IP network that does not load access routers with location management related tasks. The access routers should primarily be adapted for tasks relating to packet forwarding.

Another object of the present invention is to provide an enhanced paging functionality that utilizing location information from said location management system within said IP network.

The above-mentioned object is achieved by a location management system in an Internet Protocol, IP, communication network that is adapted for wireless communication. The wireless IP network comprises multiple routers wherein at least one of the routers is an access router adapted for wireless communication with mobile nodes, wherein an area served by one access router is a cell. The location management system is divided into at least one location area manager, and at least one regional location manager, the location area manager is a first signaling server and the regional location manager is a second signaling server, one of said location area manager and regional location manager comprises means for maintaining a list of mobile nodes located within at least one location area which is a first predefined set of cells. The regional location manager comprises means for managing location information within a single location management region, which is a second predefined set of cells, and wherein the location area manager and regional location manager are connected to each other and adapted to exchange information.

Moreover, the above-mentioned object is achieved by a paging server in an Internet Protocol, IP, communication network adapted for wireless communication, wherein the wireless IP network comprises multiple routers. At least one of the routers is an access router adapted for wireless communication with mobile nodes, wherein an area served by one access router is a cell. The paging server comprises means for obtaining location management information from a location management system and means for multicasting paging requests to access routers wherein the access routers is determined by using said location management information.

Preferred embodiments are set forth in the depending claims.

An advantage with the present invention is that the location management is separated from the routing. The Access Routers are no longer involved within the location management or paging. This implies that the access routers are not required to be aware of paging areas or location areas. The only location management task required by the access router is to send handover notification to the Regional Location Manager.

Another advantage with the present invention is that it provides a centralized entity, the location management system, which overviews the mobility of a particular mobile node and is adapted to analyze or possibly predict its mobility pattern for optimizing paging or other functions of the network (e.g., location aware services changes).

Moreover, it removes the need to add paging related functions to access routers and to configure them according to paging settings. Further, it allows implementing advanced paging schemes without overloading access routers with configuration and processing.

DETAILED DESCRIPTION OF THE INVENTION

Figure 1:
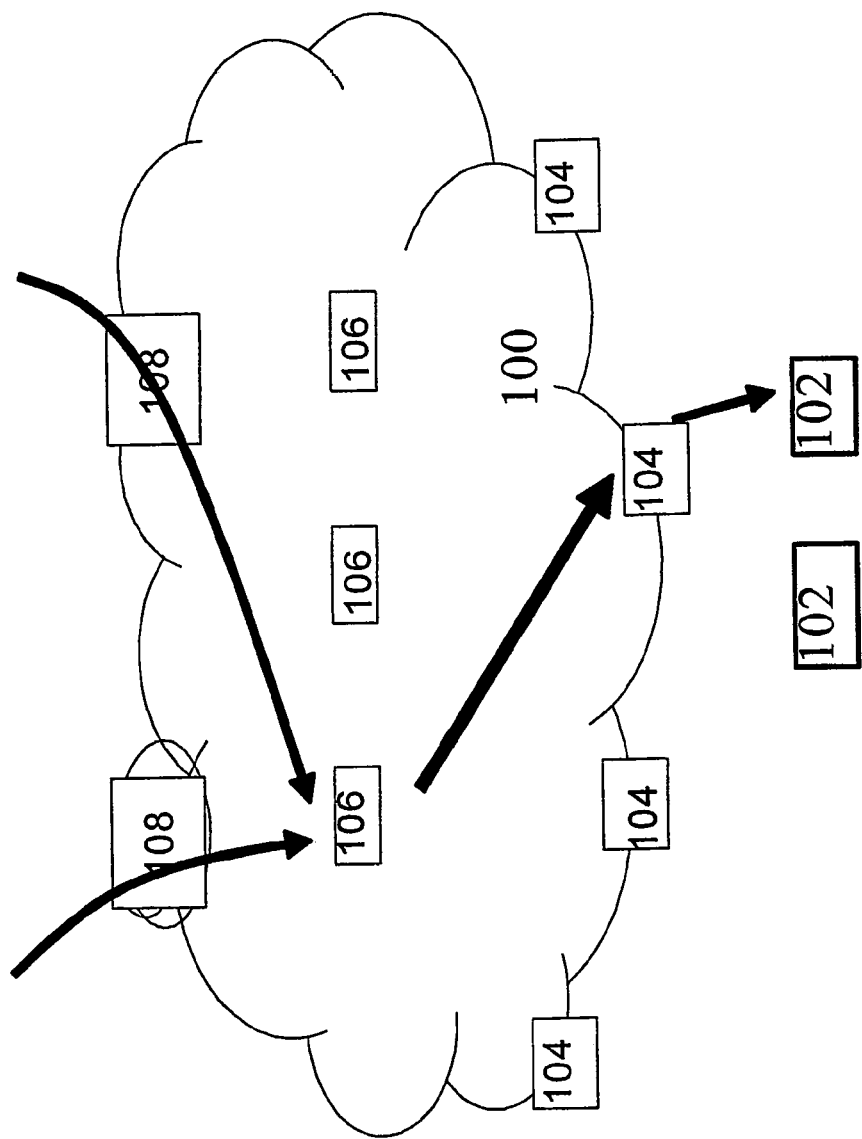
FIG. 1 is a schematic illustration of a BCMP network according to prior art.
Figure 2:
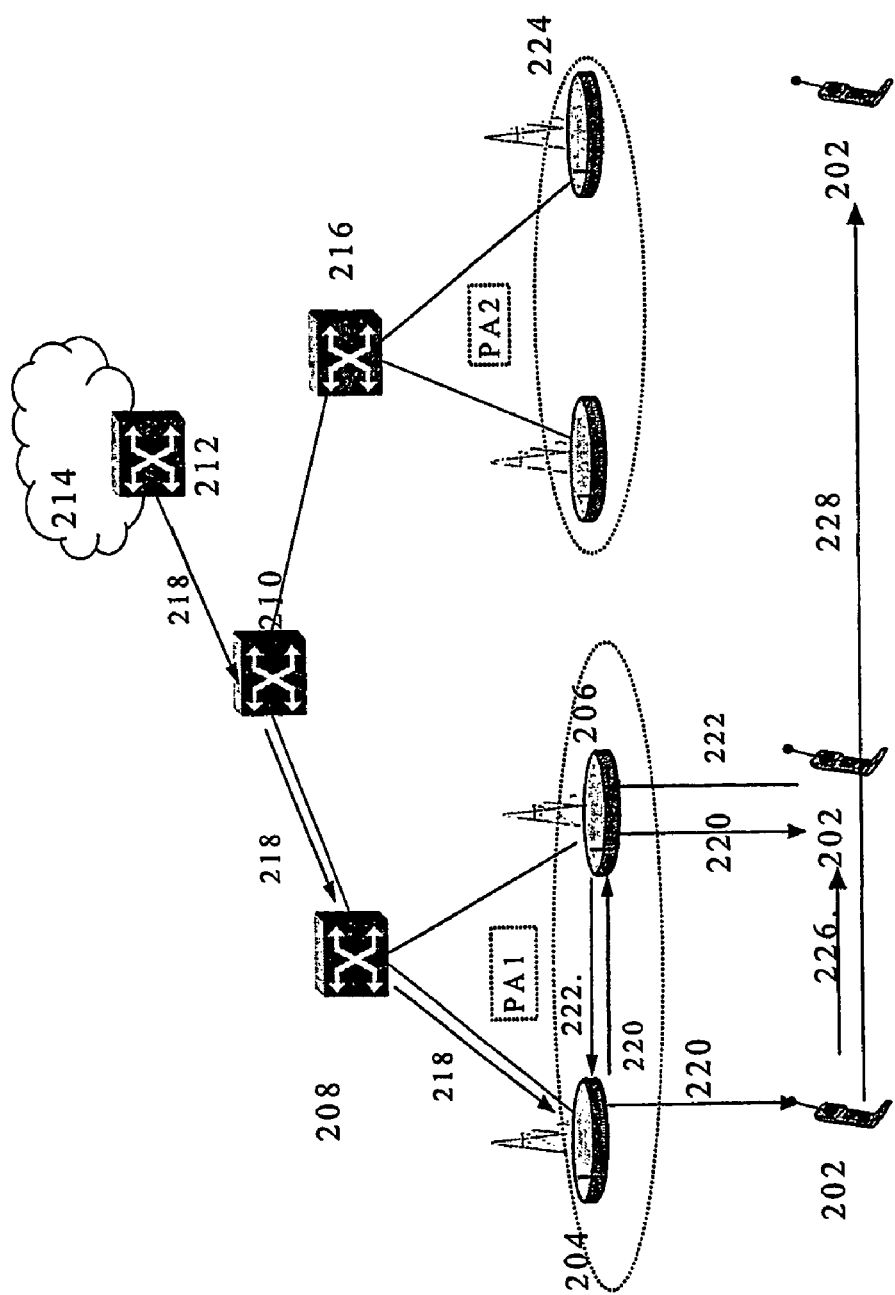
FIG. 2 is a schematic illustration of a paging procedure in a BCMP network according to prior art.
Figure 3:
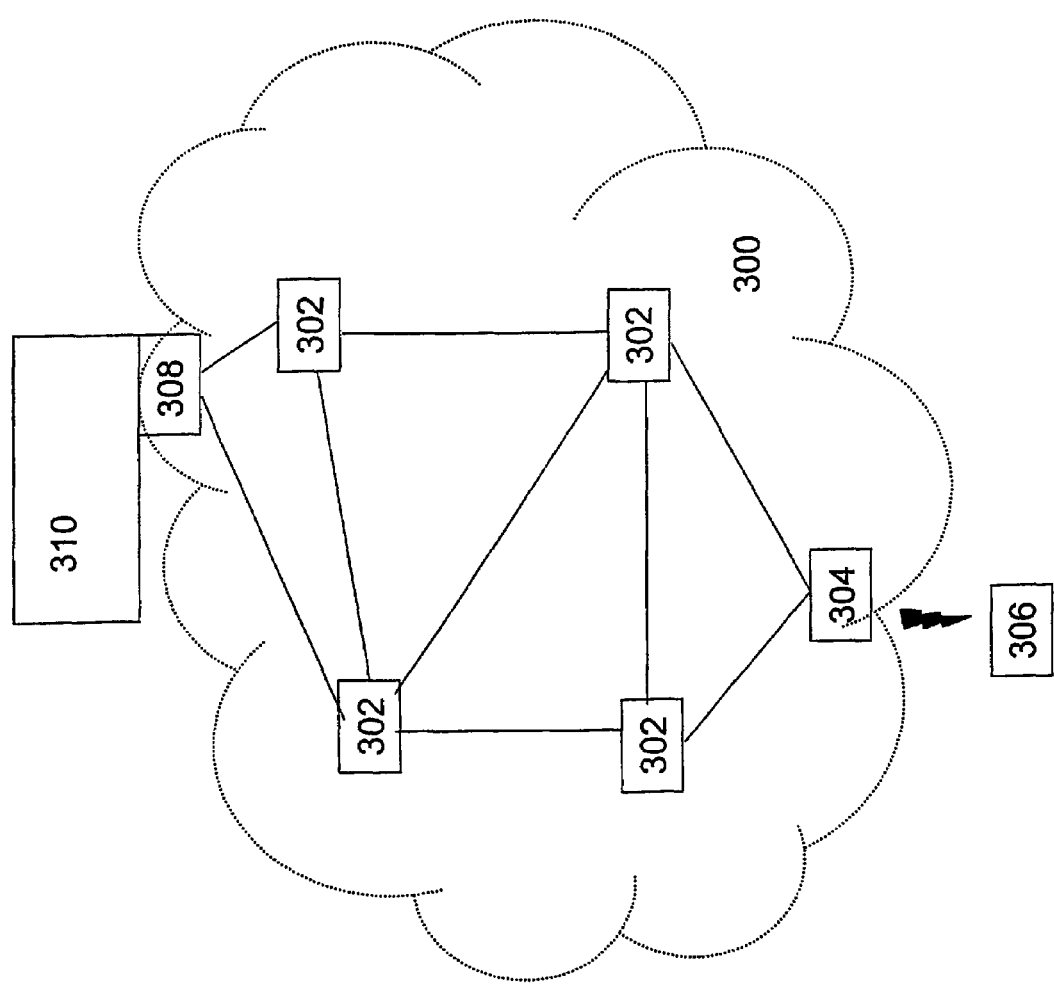
FIG. 3 is a schematic illustration of an IP network where a location management system according to the present invention may be implemented.

The present invention is applicable to an IP network 300, which is exemplified in FIG. 3, comprising a plurality of routers 302, wherein at least one of the routers is an Access Router (AR) 304. The AR 304 is the closest router to the radio interface and it is associated with an access point 308 to which wireless Mobile Nodes (MN) 306, e.g. laptops, can connect for transmission of IP traffic. That implies that the access point 308 comprises a unit for wireless communication, e.g. a base station. The MN 306 is hence a device accessing the network 308 via an access point. A Mobile User is a node or subscriber who is using the network. A mobile user may have various MNs out of which more than one may be connected to the network 300 at the same time. The ARs are connectable to the Internet 310 via further routers 302 and gateways 308. In addition, the IP network is required to comprise entities handling the mobility. An example of such IP network 300 is a BCMP network 100 in accordance with FIG. 1, and a Hierarchical Mobile IP [HMIPv6] network that is running a similar protocol to BCMP.

In accordance with a first aspect of the present invention a set of functional entities that together are called Location Management system is specified. The Location Management system according to the present invention makes it possible for the network operators to trace the mobility of the MNs and use it to optimise operation or to provide location aware services. In particular, Location Management allows the network operator to find out the location of a mobile user; obtain the list of mobile users located in a given area; be alerted when a mobile user moves into or out of a given area; or find and eventually predict special mobility patterns (speed, direction) of users.

Figure 4:
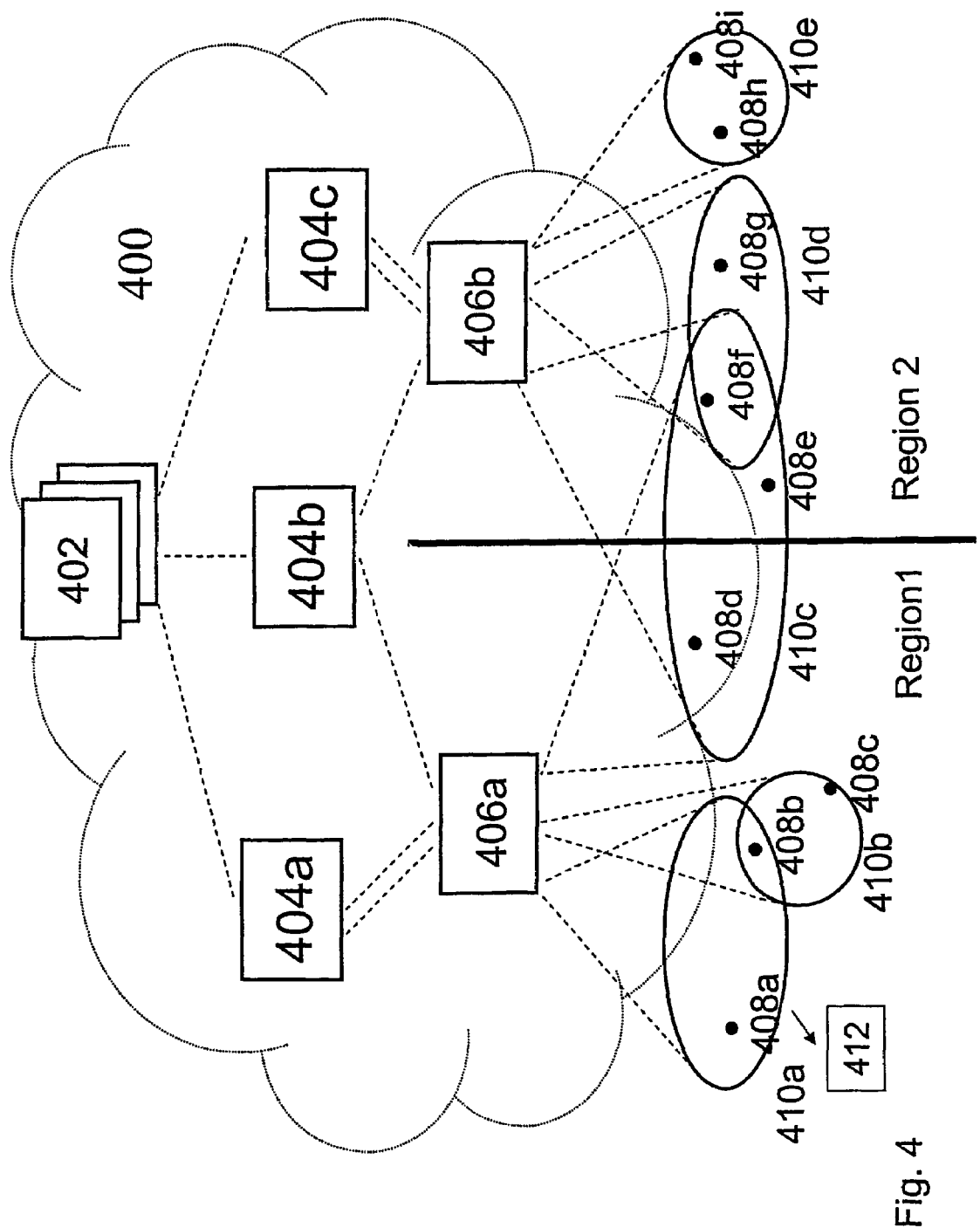
FIG. 4 is a schematic illustration of the location management system according to the present invention.

In accordance with the present invention, the location management system 400 comprises at least one Location Area Manager (LAM) 404a-c and at least one Regional Location Manager (RLM) 406a-b. This is illustrated in FIG. 4. The location management system 400 comprises further a Location Manager (LM) 402 if there is more than one LAM 404a-c. The LM 402 is used when the location management system comprise more than one LAM. The LM 402 is an interface to the LAMs 404a-c. Requests to the location management system 400 arrive to the LM 402. The LM 402 dispatches the request to the appropriate LAM. The functionality of the LAMs 404a-c and the RLMs 406a-b is described below.

Location Area

A Location Area (LA) 410a-e is a pre-defined set of cells used to determine the location of the MNs, wherein the term cell is well-known for a man skilled in the art. An IP network where the location management system may be implemented may contain any number of LAs 410a-e that may arbitrarily overlap. The Network operators may define the LA 410a-e by listing the cells it contains. If needed, the LAs 410a-e can be as small as a single cell.

Location information on a per cell basis is not always needed. In addition, updating user location database on a per cell basis would create significant signaliing and processing load in the location management system. The architecture of the location management system according to the present invention allows network operators to define customized LAs. Location information can thus be obtained on a per LA basis.

Location Area Managers

A Location Area Manager (LAM) 404a is a signalling server responsible for the LA 410a. The LAM 404a may be responsible for more than one LA 410a. The LAM 404a contains a central processor, some data storage device (e.g., hard disk) and a communication interface to send and receive control messages. The network may contain a single LAM or multiple LAMs. In the case of multiple LAMs, they are co-ordinated by the LM 402.

In accordance with a first embodiment of the present invention, the LAM 404a maintains a list of MNs 412 located in the particular Location Area 410a. One LAM may maintain lists for a large number of LAs. The LAM 404a may be combined with the RLM 406a, or it may be a separate server.

Figure 5:
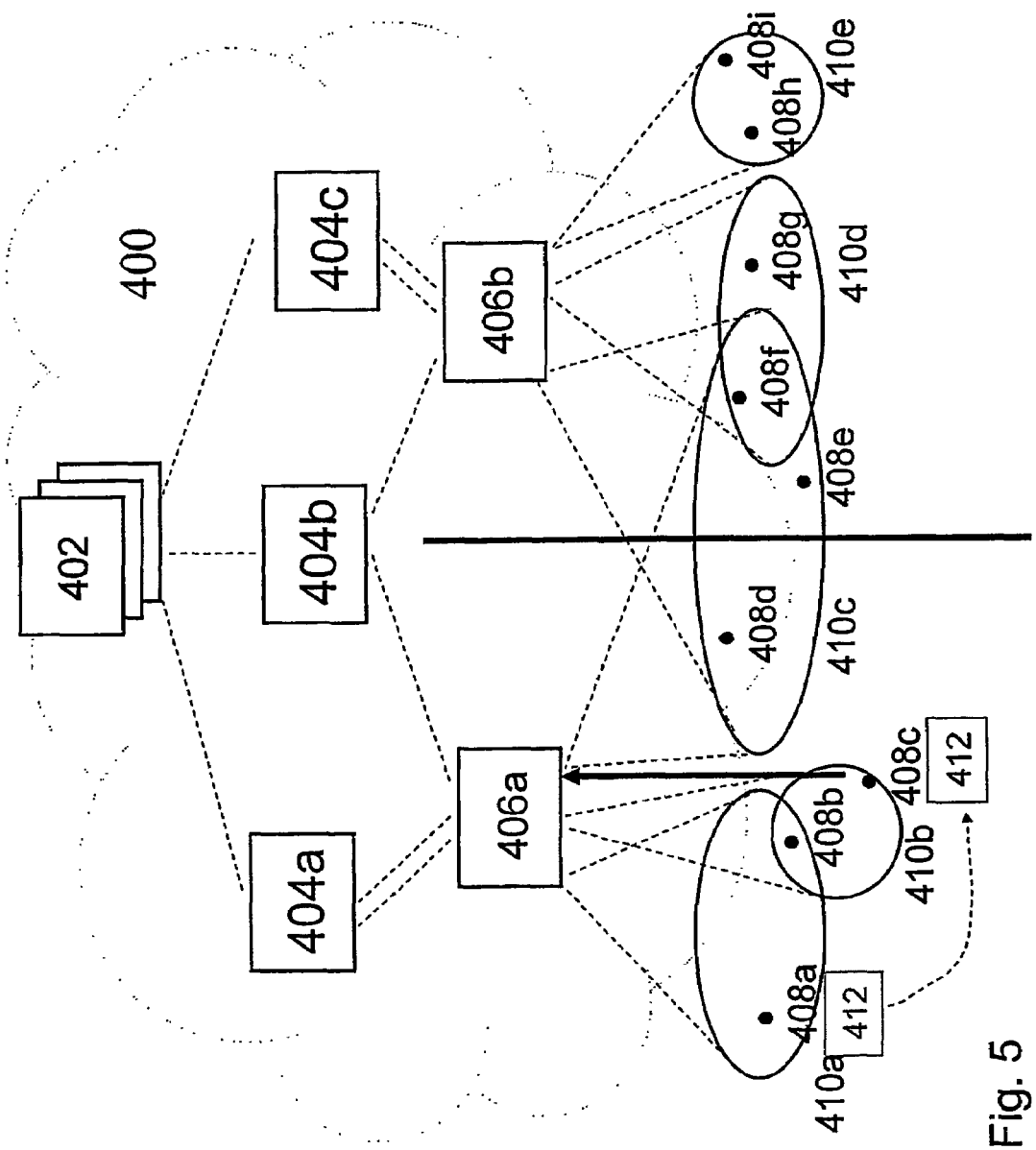
FIG. 5 is a schematic illustration of a first handover scenario in a network that comprises the location management system according to the present invention shown in FIG. 4.

The RLM 406a notifies the appropriate LAM 404a when a handover results in a change of LA, which is illustrated in FIG. 5. The LAMs 404a,b in turn, update their respective lists.

According to a second embodiment of the present invention, the LAMs does not maintain the list of mobile nodes in particular Location Areas if that task is performed by RLMs. In that case LAMs serve as signalling forwarding entities. When they receive a request for a particular LA, they multicast the request to all RLMs that have ARs in the given LA. Then LAMs also collect and merge the responses.

Regional Location Manager

A Regional Location Manager (RLM) 406a is a signalling server that is responsible for handling location management operations inside its respective region, region1. Each region comprises a pre-defined subset of cells. The RLM 406a contains a central processor, some data storage device (e.g., hard disk) and a communication interface to send and receive control messages. The network may contain one single or a multiple RLMs depending on the number of regions it is partitioned into. For scalability, the location management related tasks may be distributed between a plurality of RLMs 406a-b. The network is hence partitioned into location management regions that preferably are non-overlapping. Thus, each region is handled by the RLM 406a, which is not required to be aware of LAs 410d-e that are outside its region.

Each cell (i.e. AR 408a-i) of the network should be assigned to at least one RLM 406a-b, which is illustrated in FIG. 4. The group of cells assigned to one RLM is called location management region. The partitioning of cells into location management regions need not be co-ordinated with LAs. Note the difference between LAs and location management regions.

The Location Areas are defined in order to define areas e.g. a city or a district. The size and structure of LAs is defined such that the information obtained is useful—by using location areas, the network operator can tell the location of mobile users with a granularity of location areas. If each city is a separate LA 410a then the network knows in which city the MN 412 is located in, or if each district is a location area then it knows which district the MN is located in, and so on. Thus, the higher the number of LAs, the more accurate information is possible to gather, but the higher the processing and management load in the network becomes.

Location management regions, in contrast, are used merely for load distribution in the network. Instead of handling the location management of the entire network in one signalling server, cells are portioned and assigned to a plurality signalling servers, called RLMs 406a-b. The size of the location management regions is determined by the capacity of RLM and by the rate at which the MNs 412 perform handovers in the particular area.

The RLMs 406a-b keep track of all the nodes in their region. They may be equipped with intelligence to match mobility patterns to user mobility for categorising the users; to predict user mobility; or for other purposes.

Since mobile networks may be very large and the number of mobile users very high, a query of location information is required to be a relatively cheap operation, e.g., listing the users located in a given area should not include querying all the cells in the particular area. For example, if the location area membership information is needed very rarely then it is a waste to continuously maintain these lists. On the other hand, if they are needed very frequently then it is inefficient to broadcast queries to each cell when the lists are needed. Using Regional Location Managers allows using a solution between these two extremes. An example is, when RLMs 406a do not automatically forward each notification to the LAM 404a, but wait until the LAM 404a asks for the information.

Handover Notifications

When a mobile node moves into a new cell (i.e., performs a handover), the RLM should be notified. In what follows, it is assumed that the AR 408b, that the MN 412 will be connected to after handover, sends a notification to the RLM(s) 406a it is assigned to in accordance with FIG. 5. Alternatively, a notification could be sent by the old AR 408a or by the Anchor Point if such exists. It is also possible to send separate notifications from two or all of these three entities at a single handover event.

According to one embodiment of the present invention, one MN 412 can be "assigned to" multiple RLMs 406a-b and send the notifications to them according to a load sharing principle. In an extreme case, all ARs can be assigned to the same RLMs(s).

In accordance with the present invention, sending the handover notification to the RLMs 406a-b is the only task ARs 408a-i need to perform for location management. This allows the location management system to be separated from routing. For example, it allows the ARs 408a-i to be unaware of the structure of the LAs 410a-d and it removes the need to update all ARs when a new LA is created.

Figure 6:
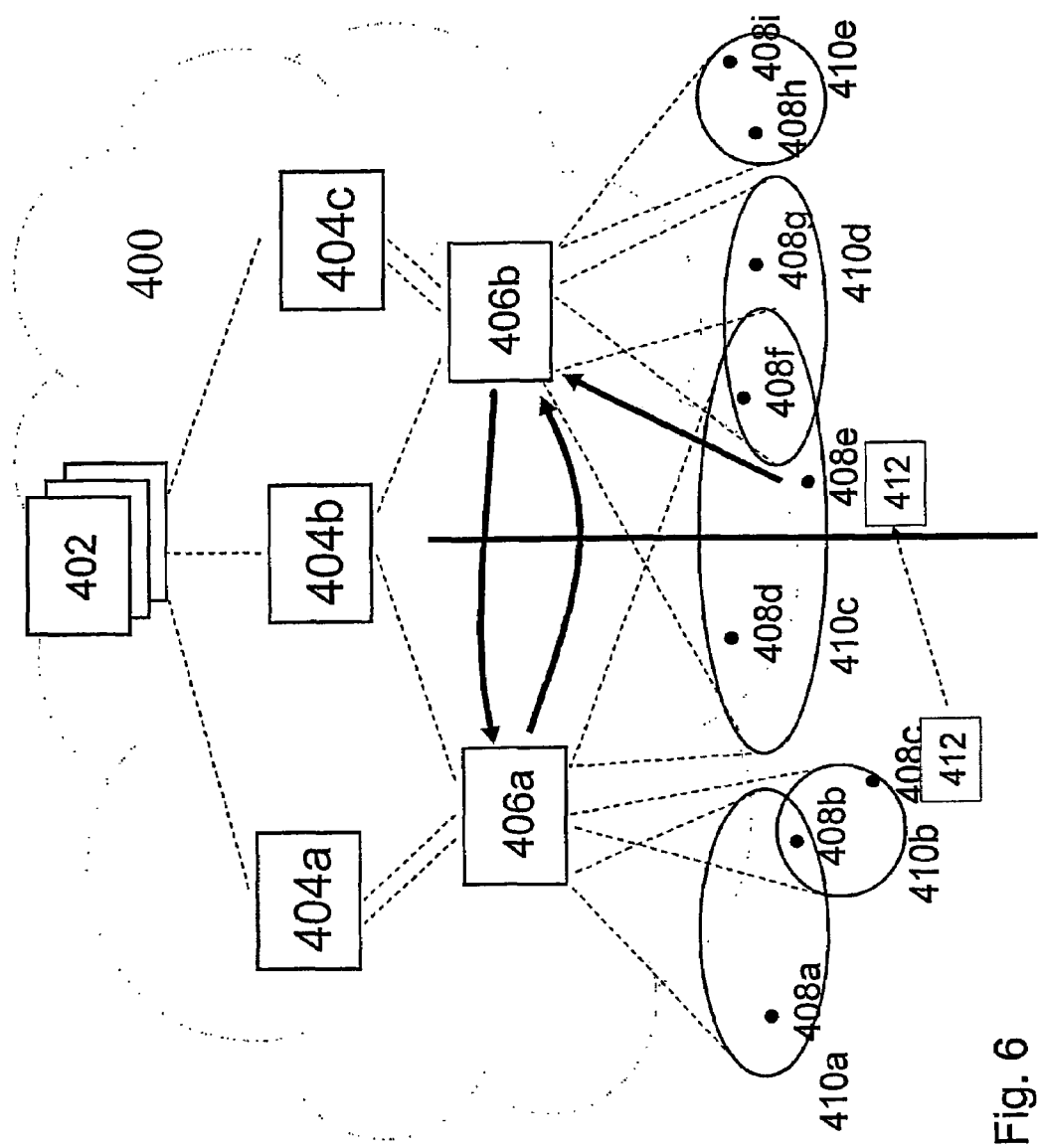
FIG. 6 is a schematic illustration of a second handover scenario in a network that comprises the location management system according to the present invention shown in FIG. 4.

In FIG. 6, the scenario when the handover brought the MN 412 into a new region is illustrated. The new RLM 406b contacts the old RLM 406a to download the accumulated information about the MNs 412 movement.

Extracting Location Change Information

When a MN 412 performs the handover, it may move into or out of any number of Las 410a-e depending on which two cells it performs the handover between. The role of the RLMs 406a-b is to decide which LAs 410a-e are affected by the particular handover.

In accordance to one embodiment, each RLM 406a,b knows which of the cells in its region belongs to which LA(s). In accordance with another embodiment, the RLM 406a-b obtains this information on demand. In addition, the RLMs 406a-b may be aware of, or may have access to a LA membership 410a-e of other cells in the network.

When the RLM 406a-b receives the handover notification, it checks the Location Area membership of the cells affected in the handover. Based on this information, the RLM 406a-b determines whether the MN 412 has entered one or more new LAs 410a-e or has left one or more LAs 410a-e. If the handover results in an entry or exit to/from one or more LAs 410a-e, according to one embodiment the RLM 406a-b notifies other network entities such as the LAM 404a-c or according to another embodiment, the RLM 406a-b updates a local information base. According to a further embodiment, the RLM 406a-b does not notify the other network entities until it receives a request for such notification.

In order to find out the location of a particular mobile node using BCMP or HMIPv6, the Anchor Point should be contacted. The Anchor Point knows which Access Router the mobile node is located at. However, the presence of an Anchor Point is not required by the present invention. The method of finding the correct AR may be performed in another way which is apparent by the man skilled in the art. Next, it must be established to which LAs this particular AR belongs. This may be performed by using a database or by contacting the AR and its RLM.

Configuring Location Areas

According to the architecture of the location management system 400 in accordance with FIG. 4, the definition of the LAs needs to be configured in RLMs. However, not all RLMs need to be aware of all LAs. Typically, the RLM would know only about those LAs that are included in, or have an overlap with the region of the RLM.

Paging Servers

Figure 7:
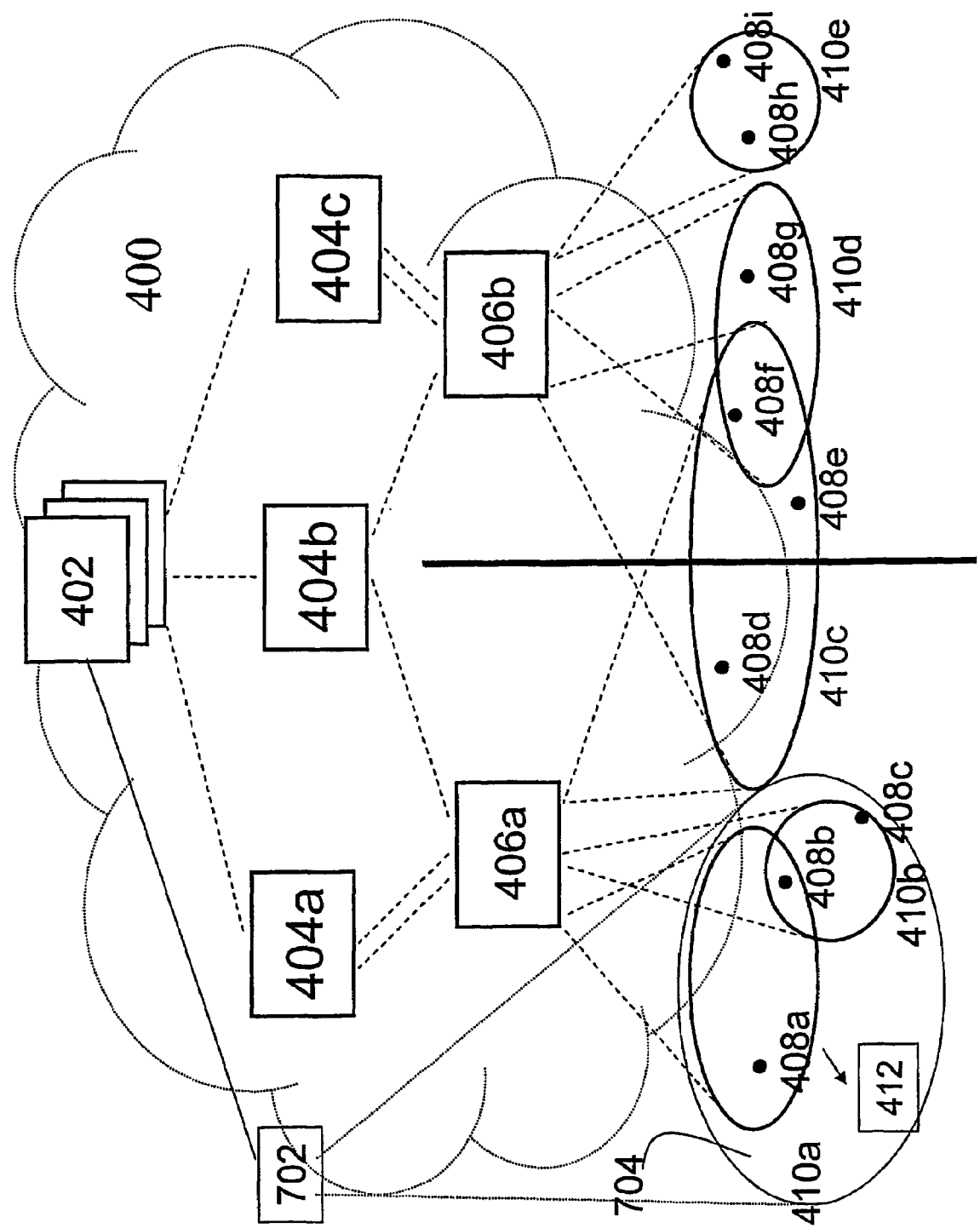
FIG. 7 is a schematic illustration of a paging server connected to the location management system according to the present invention shown in FIG. 4.

In accordance with a second aspect of the present invention, a paging server is introduced, that in connection with the location management system, instead of the ARs, performs paging of idle MNs. This is illustrated in FIG. 7, which shows the paging server 702 connected to the location management system 400 of FIG. 4. One paging server 702 is responsible for paging within one single paging area 702. The paging area 702 is defined by an area served by a predetermined set of ARs 408a-c. Each AR is required to be covered by one paging area, however only one paging area and paging server is illustrated in FIG. 7.

The paging server 702 may be used within a network using BCMP, HMIPv6 or within another network using a similar protocol for mobile IP communication. The paging server 702 is a signalling server connected to the location management system 400, that multicasts paging messages to the destination ARs 408a-c. It 702 contains a central processor, some data storage device (e.g., hard disk) and a communication interface to send and receive control messages. The network contains a single or multiple paging servers 702. The paging server 702 may be a part of the RLM 406a.

Figure 8:
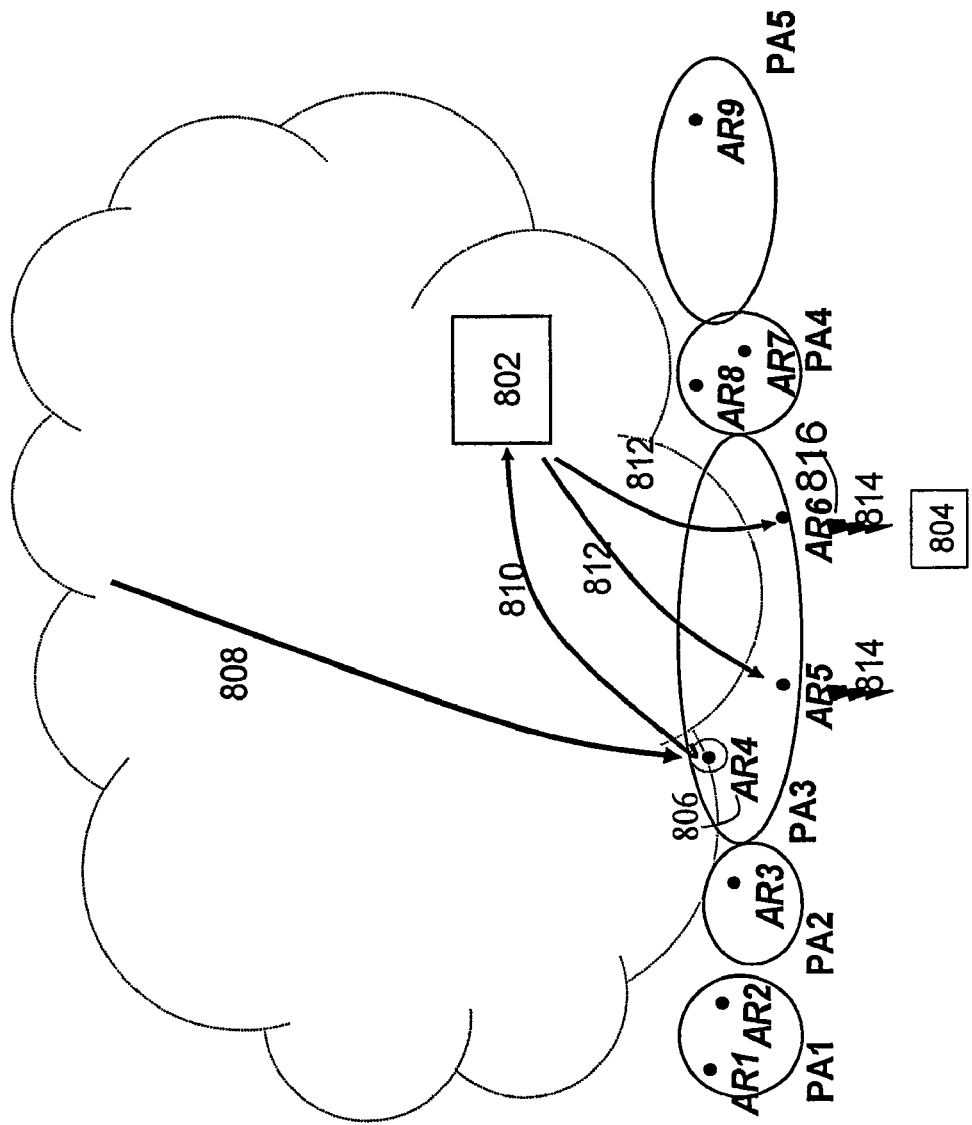
FIGS. 8, 9 and 10 is a schematic illustration showing paging procedures with paging servers according to the present invention.

The introduction of paging servers 802 modifies the BCMP paging mechanism as the schematic illustration in FIG. 8. FIG. 8 shows paging areas PA1-5, wherein one of the paging areas is controlled by the illustrated paging server 802. The MN 804 is located within an area covered by the AR 816 which is within said paging area PA3. The operation of MNs 804 is unchanged. However, when the AR 806 receives data packets 808 addressed to the idle MN 804 then it contacts the paging server 802 instead of transmitting paging requests 810 itself. Next, the paging server 802 performs paging, i.e., transmits multicast paging requests 812, 814 in accordance with FIG. 8. Finally, as in the original BCMP paging mechanism, the MN performs a handover in response to receiving the paging request which is not shown in the figure.

If there are multiple paging servers in the network, each paging area must be uniquely assigned to one of them. Note, that the paging area may consist of the same area as the LA.

In accordance with one embodiment of the present invention, the AR 816 contacts the paging server 802 that handle the current paging area PA3 of the MN 804.

Figure 9:
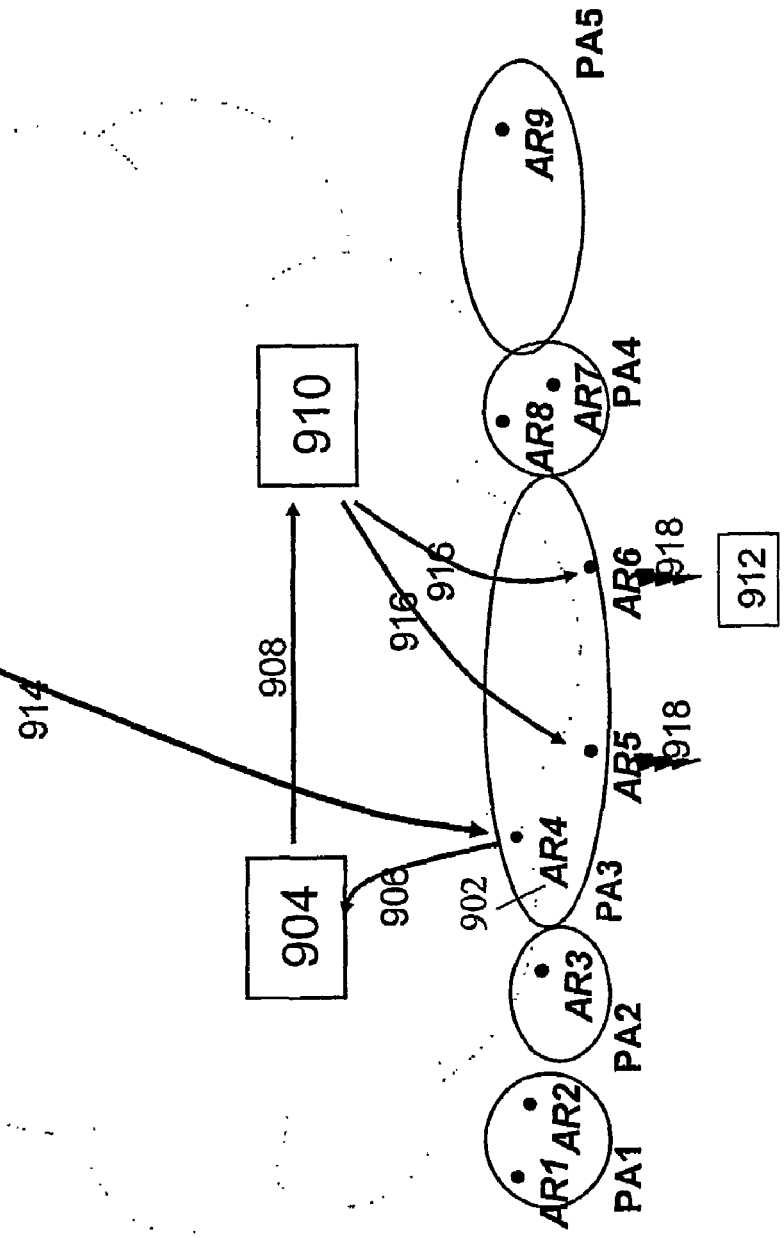

In an alternative embodiment of the present invention, illustrated in FIG. 9, wherein FIG. 9 is a schematic illustration similar to FIG. 8, the AR 902 may contact 906 any paging server 904 (e.g., the one that is configured by a network management or by the one that is closest to the AR 902) when the AR 902 receives data packets 914 addressed to the idle MN 912, and let the contacted paging server 904 forward the request 908 to the appropriate paging server 910. The paging server 910 performs paging, i.e., transmits multicast paging requests 916, 918 accordingly. This removes the need for ARs to know the association of paging areas to the paging servers. In this case either the request 906 sent by the AR 902 to the paging server 904 must contain a reference to the MN's 912 paging area PA3 or some paging servers must be aware of the MN's 912 paging area. The latter can be achieved by regularly updating one or more paging servers when the MN 912 changes paging area.

In accordance with a further embodiment of the present invention, paging servers 904,910 is used in advanced paging schemes where paging is not performed according to strictly pre-defined paging areas. For example, the paging servers 904,910 may have a database that contains a custom paging scheme for the individual MNs 912 (e.g. paging the MN in its home area first). This database should then be contacted when paging is initiated and paging should be performed accordingly.

In accordance with yet another embodiment of the present invention, paging servers contact the location management system and obtain information about the past location or past mobility of the MN and use this information to determine the set of ARs at which the MN shall be paged or to aid advanced paging schemes.

Figure 10:
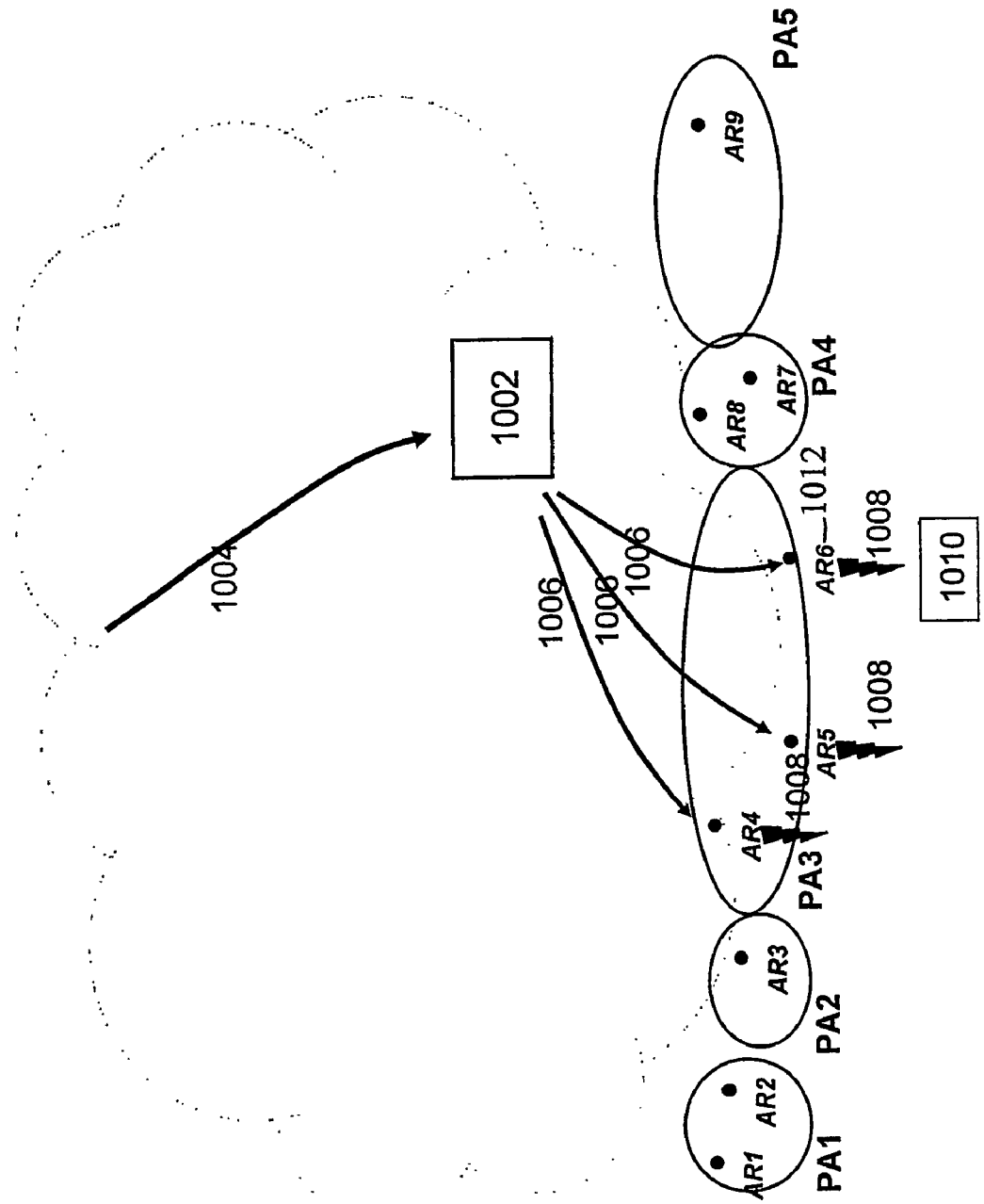

In addition to forwarding paging messages, an alternative operation of the paging servers would be in accordance with yet a further embodiment of the present invention as illustrated in FIG. 10. The paging server 1002 in this alternative can receive and temporarily store data packets 1004 addressed to the idle MN 1010. When the MN 1010 goes into idle state then the paging server 1002 must be notified. Future data packets addressed to the MN's 1010 IP address will then be delivered to the paging server 1002 instead of the AR 1012. The paging server 1002 should then tempo-rarily store these packets 1004 and initiate the paging 1006,1008 as described previously.

Obtaining Location Information

The architecture of the location management system 400, as illustrated in FIG. 4, according to the present invention allows the network operators to obtain a list of MNs 412 located in the given LAs 410a-e. This is performed by asking the appropriate LAM 404a-c (possibly via the LM 402), who may check the list it maintains or ask the appropriate RLMs.

obtain a mobility characteristic or predicted movement of the MN 412. This is achieved by asking the current RLM 406a of the MN 412.

aid the optimal selection of paging areas in case of an incoming message destined to an idle mobile node. This is achieved by contacting the appropriate paging server. One important benefit of the present invention is that it allows an operator to have several LAs. Hence, there is a possibility for optimisation in terms of which LA the MN should be paged in.

obtain notifications when the MN 412 enters or exits LAs 410a-e (from RLMs 406a-b or from LAMs 404a-c).

The present invention is not limited to the above-described preferred embodiments. Various alternatives, modifications and equivalents may be used. Therefore, the above embodiments should not be taken as limiting the scope of the invention, which is defined by the appended claims.

The invention claimed is:

1. A location management system in a packet switched communication network adapted for wireless communication wherein the packet switched communication network is an Internet Protocol (IP) network and comprises multiple routers at least one of the routers being an access router adapted for wireless communication with mobile nodes, an area served by the at least one access router is a cell; the location management system comprising:

at least one location area manager and at least one regional location manager; wherein the at least one location area manager comprises a first signaling server and the at least one regional location manager comprises a second signaling server respectively separated from said multiple routers and one of said at least one location area manager and said at least one regional location manager comprises means for maintaining a list of mobile nodes located within at least one location area wherein one mobile node is associated to multiple regional location managers;

a first predefined set of cells defines said at least one location area and the at least one regional location manager further comprises means for managing location information within a single location management region wherein the single location management region is a second predefined set of cells; and the at least one location area manager and the at least one regional location manager are inter-connected and adapted to exchange information.

2. The location management system according to claim 1, wherein the at least one location area manager comprises means for maintaining a list of mobile nodes located within the at least one location area.

3. The location management system according to claim 2, wherein: the information exchange comprises a notification to a location area manager of the at least one location area manager that is responsible for the mobile node from the at least one regional location manager the information exchange is responsive to a handover of said mobile node resulting in a change of the location area of said mobile node; and wherein said at least one location area manager comprises means for updating a list of mobile nodes of the at least one location area manager.

4. The location management system according to claim 2, wherein the at least one regional location manager comprises means for notifying the at least one location area manager upon a request from said at least one location area manager.

5. The location management system according to claim 1, wherein the at least one regional location manager comprises means for maintaining a list of mobile nodes located within the at least one location area.

6. The location management system according to claim 5, wherein the at least one regional location manager comprises means for updating the list in a local information base.

7. The location management system according to claim 1 wherein the at least one regional location manager is aware of the at least one location area within a location management region of the at least one regional location manager.

8. The location management system according to claim 1 wherein each of the at least one regional location manager comprises information of which access routers belong to which of the at least one location areas.

9. The location management system according to claim 1, wherein the at least one regional location manager comprises means for obtaining said information on demand.

10. The location management system according to claim 1, wherein said location management system is connected to a paging server and the location management system and the paging server are adapted to exchange information with each other.

11. The location management system according to claim 10, wherein said information exchange comprises location management information to the paging server and wherein said paging server comprises means for multicasting paging requests to at least one access router.

12. The location management system according to claim 10 wherein the regional location manager comprises means for transmitting information about a previous location of the mobile node or a previous mobility of the mobile node to the paging server in order to determine a set of access routers at which the mobile node shall be paged or to aid advanced paging schemes.

13. The location management system according to claim 10 wherein a paging area, defining an area served by a predetermined set access routers, is uniquely assigned to one single paging server.

14. The location management system according to claim 10 wherein the access router comprises means for contacting the paging server the access router belongs to.

15. The location management system according to claim 10 wherein the access router comprises means for contacting any paging server, said any paging server comprising means for forwarding the message to the paging server said access router belongs to.

16. The location management system according to claim 10, wherein the paging server comprises a database that contains custom paging schemes for individual mobile nodes.

17. The location management system according to claim 10, wherein the paging server comprises means for receiving and temporarily storing data packets addressed to idle mobile nodes.

18. The location management system according to claim 10, wherein the paging server is implemented within one of the at least one regional location manager server.

19. The location management system according to claim 10, wherein the paging area is equal to one of the at least one location area.

20. A paging server in a packet switched communication Internet Protocol network adapted for wireless communication, wherein the packet switched communication network comprises multiple routers; at least one of the multiple routers being is an access router adapted for wireless communication with mobile nodes; and wherein the paging server is separated from said multiple routers; the paging server comprising:

a database that contains custom paging schemes for individual mobile nodes:

means for obtaining location management information from a location management system that comprises at least one location area manager and at least one regional location manager and is connected to means for multicasting paging requests to said multiple routers wherein said at least one access router is determined by using said location management information.

21. The paging server of claim 20, wherein the paging server further comprises means for receiving and temporarily storing data packets addressed to idle mobile nodes.

22. The paging server according to claim 20, wherein the paging server is implemented within one of the at least one regional location manager servers.

23. The location management system according to claim 20, wherein the paging area is equal to one of the at least one location areas.

24. The paging server according to claim 20 further comprising means for receiving information about a previous location of the mobile node or a previous mobility of the mobile node in order to determine a set of access routers at which the mobile node shall be paged or to aid advanced paging schemes.

25. The paging server according to claim 20 wherein a paging area, defining an area served by a predetermined set of access routers, is uniquely assigned to one single paging server.

26. The paging server according to claim 20 wherein the at least one access router comprises means for contacting any paging server, said any paging server comprising means for forwarding the message to the paging server said access router belongs to.

* * * * *

UNITED STATES PATENT AND TRADEMARK OFFICE
CERTIFICATE OF CORRECTION

PATENT NO. : 7,269,425 B2  
APPLICATION NO. : 10/489223  
DATED : September 11, 2007  
INVENTOR(S) : Valko et al.

Page 1 of 1

It is certified that error appears in the above-identified patent and that said Letters Patent is hereby corrected as shown below:

In Column 6, Line 16, delete "signaliing" and insert -- signalling --, therefor.

In Column 6, Lines 37-40, delete "The RLM 406a......respective lists." and insert the same on line 36, after "separate server." as a continuation of paragraph.

In Column 10, Line 66, in Claim 3, delete "manager" and insert -- manager; --, therefor.

Signed and Sealed this

Twenty-second Day of July, 2008

JON W. DUDAS  
*Director of the United States Patent and Trademark Office*